Figure 2:
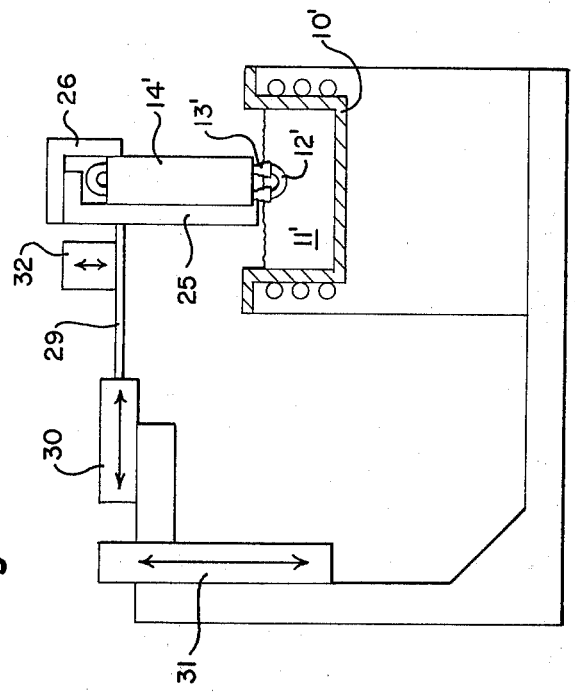

United States Patent [19]
Antonevich

[11] 3,989,179
[45] Nov. 2, 1976

[54] METHODS OF DIP SOLDERING
[75] Inventor: John N. Antonevich, Jamestown, N.Y.
[73] Assignee: Blackstone Corporation, Jamestown, N.Y.
[22] Filed: Sept. 9, 1975
[21] Appl. No.: 611,622

[52] U.S. Cl. .................................. 228/110; 228/1; 228/262
[51] Int. Cl.² ........................ B23K 1/06; B23K 1/08
[58] Field of Search ............... 228/1, 19, 36, 37, 40, 228/110, 111, 125, 180, 258, 259, 260, 262

[56] References Cited
UNITED STATES PATENTS
2,485,444  10/1949  Hofberg ............................ 228/40 X
3,834,015  9/1974  Di Renzo ........................ 228/125 X Primary Examiner—Al Lawrence Smith
Assistant Examiner—Margaret Joyce
Attorney, Agent, or Firm—Buell, Blenko & Ziesenheim

[57] ABSTRACT

A method is provided for eliminating "icicles" or ligaments and other manifestations of dripping solder from articles which are dip soldered by vibrating the articles simultaneously with removing them from the solder bath and continuing to vibrate the articles until the solder thereon has at least levelled.

6 Claims, 2 Drawing Figures

METHODS OF DIP SOLDERING

This invention relates to methods of dip soldering and particularly to methods for eliminating the problems of "ligaments" or "icicles" forming on the soldered articles after dipping.

The use of dip soldering techniques, in which an article assembled from several parts is dipped into a molten bath of solder, either soft or hard, is well known and is used in a variety of industries. For example, this dip soldering technique is used in the manufacture of automobile radiators, heater cores, in the manufacture of air conditioner heat exchangers, in transmission coolers and a great variety of other practices. One of the continuing problems in dip soldering has been the formation of "ligaments" or "icicles" or small solidified droplets on the bottom of such dip soldered articles after withdrawal from the solder and during cooling. These icicles, etc. are not only unsightly, they are in some cases a hazard and in many cases must be removed for subsequent operations.

I have discovered a method of eliminating this problem and improving the solder joint at the same time.

Preferably I dip the article to be soldered into the molten solder and remove the article from the solder at a predetermined time thereafter while simultaneously subjecting the article to the vibrational forces as it leaves the molten solder and until the solder is at least levelled and preferably until it has solidified. The vibrational forces are preferably low frequency or sonic forces applied to the part being soldered. The application of such forces causes levelling of the solder and improved penetration into the joint area being soldered. However, ultrasonic frequencies may be used.

I have found that it is the acceleration or deceleration of objects that develops the forces which level the molten solder. The preferred method of accomplishing this is by vibrating or impacting the objects at sonic frequencies.

Figure 1:
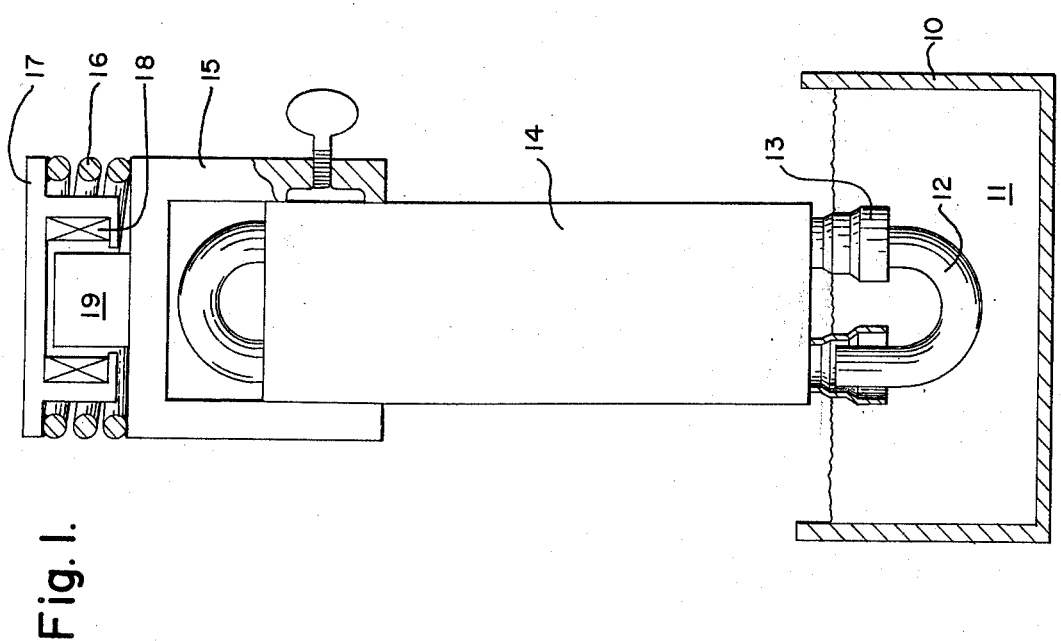

In the foregoing general description I have set out certain objects, purposes and advantages of this invention. Other objects, purposes and advantages of this invention will be apparent from a consideration of the following description and accompanying drawings in which:

FIG. 1 is a side elevational view of a dip soldering pot and article holder embodying my invention; and FIG. 2 is a side elevational view of a second embodiment of my invention.

Referring to the drawings I have illustrated a dip solder pot 10 of conventional construction containing a molten bath of solder 11 into which the return bend 12 and flared tube end 13 of a heat exchanger 14 are dipped for soldering. The heat exchanger is carried in a clamp 15 fixed to a spring 16 suspended from carrier 17. A solenoid vibrator coil 18 is mounted in carrier 17 surrounding armature 19 on clamp 15. When the return bend 12 and tube end 13 are dipped into solder bath 11 the coil 18 is actuated to vibrate the heat exchanger 14 and the return bend 12 and tube end 13. This vibration is continued as the part is removed from the solder bath and until the solder on the parts has cooled and solidified. This vibration of the part as it is withdrawn from the solder bath causes the solder to enter more completely into the joint to be soldered providing better penetration and better soldering and causes the excess solder to level over the dipped parts to form a smooth skin instead of dripping and forming the undesirable icicles which have characterized dip solder parts generally.

Referring to FIG. 2 I have illustrated a similar dip solder operation to that of FIG. 1 except for the holding clamp arrangement. In this embodiment those parts which are the same as parts of FIG. 1 bear like numbers with a prime suffix. In this embodiment air conditioner coil 14 is held on support frame 25 by clamp 26 with the expanded tube ends 13' and return bend 12' beneath the surface of the molten solder 11'. The support frame 25 is mounted on a cantilever arm 29 provided with horizontal drive means 30 and vertical drive means 31. A vibrating or impacting means 32 is provided on cantilever arm 29 to cause the support frame 25 to accelerate and/or decelerate vertically.

In operation the tube end 13' and return bend 12' are driven together, the coil 14' is mounted on support 25 by clamp 26, the vertical 31 and horizontal 30 drive means are energized to move the coil 14' over solder pot 10' and lower it until the tube ends 13' and return bend 12' are immersed in molten solder 11' and held there until they reach the temperature of the solder. The vibrating or impact means 32 are energized when the tube end 13' and return bend 12' are immersed in the solder and continued until the tube end 13' and return bend 12' are removed from the solder 11' and have cooled to the point where all solder has solidified. At this point vibration is stopped.

In the foregoing specification I have set out certain embodiments and practices of my invention, however, it will be clear to those skilled in this art that the invention may be otherwise embodied within the scope of the following claims.

I claim:

1. A method of eliminating "icicles" and drippings of solder from generally horizontally extending surfaces including U-shaped portions of heat exchangers and the like, which surfaces have been dipped in a molten bath of solder and removed from said solder bath comprising the steps of accelerating and decelerating the parts simultaneously with removing them from the solder bath and continuing to accelerate and decelerate the parts until all solder thereon has levelled itself over the dipped surfaces.

2. A method as claimed in claim 1 wherein the parts are vibrated in the solder bath and continuously thereafter during removal from the bath to accelerate and decelerate them until all solder thereon has solidified.

3. A method as claimed in claim 1 wherein the vibrations are at ultrasonic frequencies.

4. A method as claimed in claim 1 wherein successive impacts are applied to the parts to accelerate and decelerate them.

5. A method as claimed in claim 1 wherein at least one impact is applied to the parts to accelerate them and level solder thereon.

6. A method of eliminating "icicles" and drippings of solder from generally horizontally extending surfaces including U-shaped portions of heat exchangers and the like, which surfaces have been dipped in a molten bath of solder and removed from said solder bath comprising the steps of accelerating and decelerating said parts immediately after withdrawal from the solder bath and until the solder has levelled itself over the dipped surfaces and the solidus temperature of the solder has been reached.

* * * * *